(12) United States Patent
Nemoto

(10) Patent No.: US 6,211,651 B1
(45) Date of Patent: Apr. 3, 2001

(54) METHOD AND APPARATUS FOR CHARGING A VALVE-REGULATED LEAD ACID BATTERY

(75) Inventor: Seiji Nemoto, Kyoto (JP)

(73) Assignee: Japan Storage Battery Co., Ltd., Kyoto (JP)

(*) Notice: Subject to any disclaimer, the term of this patent is extended or adjusted under 35 U.S.C. 154(b) by 0 days.

(21) Appl. No.: 09/526,062

(22) Filed: Mar. 15, 2000

(30) Foreign Application Priority Data

Mar. 15, 1999 (JP) .................................................. 11-068852

(51) Int. Cl.$^7$ ....................................................... H02J 7/00
(52) U.S. Cl. ............................................................... 320/133
(58) Field of Search .................................. 320/133, 137, 320/150

(56) References Cited

U.S. PATENT DOCUMENTS 5,777,457 * 12/1996 Lee ........................................ 320/133
5,998,968 * 12/1998 Pittman et al. ........................ 320/133

* cited by examiner

Primary Examiner—Peter S. Wong
Assistant Examiner—Pia Tibbits
(74) Attorney, Agent, or Firm—Sughrue, Mion, Zinn, Macpeak & Seas, PLLC

(57) ABSTRACT

A charging method and a charging apparatus which can be used particularly for charging a valve-regulated lead acid battery using a Pb-Sb alloy grid as a positive electrode grid. Primary constant-current charging is performed with a pre-determined current value. The primary constant-current charging is further continued for an extension time $t_a$ after the battery voltage reaches a change-over voltage Vc. After the extension time has passed, the charging is changed over to secondary constant-current charging using a current value smaller than that of the primary constant-current charging. The extension time for continuing the primary constant-current charging is preferably set so as to be shorter as the battery temperature is higher. Also a secondary charging time for executing the secondary constant-current charging is preferably set so as to be shorter as the battery temperature is higher.

10 Claims, 3 Drawing Sheets

METHOD AND APPARATUS FOR CHARGING A VALVE-REGULATED LEAD ACID BATTERY

BACKGROUND OF THE INVENTION

1. Field of the Invention

The present invention relates to a method for charging a lead acid battery while reducing a charging current stepwise, and an apparatus therefor.

2. Description of the Background Art

Two-stage constant current charging permitting short-time charging may be performed for charging a lead acid battery used for the purpose of cycle service for electric cars, carriages, golf carts, etc.

The two-stage constant-current charging is a method in which charging is performed with a large current before the voltage of the lead acid battery reaches a predetermined change-over voltage, and the moment the voltage reaches the change-over voltage, the charging is changed over to small-current charging and the small-current charging is continued for a predetermined time until the charging rate reaches a predetermined value, for example, 120% of the discharging rate.

In such a type charging method, the period of primary charging performed with a large current needed to be carried out as long as possible in order to shorten the charging time. Therefore, the change-over voltage needed to be set to be high. However, if the change-over voltage was set to be high, the charging method became uncontrollable to bring overcharging when there was such a situation that the voltage of the lead acid battery never reached the change-over voltage though the primary charging was continued. Therefore, the change-over could not but be set to be sufficiently low to leave a margin, so that the primary charging time was shortened undesirably. Accordingly, the quantity of electricity by the primary charging was reduced. In the background-art charging method, there was a problem that reduction of the charging time could not be attained sufficiently because the reduction of electricity was compensated for in the secondary charging.

On the other hand, a valve-regulated lead acid battery having no need for water supply has been popularized in recent years. In the valve-regulated lead acid battery, battery closure is completed by a method called negative electrode absorption type in which an oxygen gas produced at a positive electrode during charging is absorbed by reaction with a charged active material (Pb) in a negative electrode to thereby suppress production of a hydrogen gas from the negative electrode. A Pb-Ca alloy grid is generally used as a positive electrode grid of such a valve-regulated lead acid battery. In such a valve-regulated lead acid battery, however, there is a disadvantage that the life of the lead acid battery is shortened if the lead acid battery is used in an extreme condition such as high temperature, deep discharge, or the like. This is because a passivation layer of $PbSO_4$ is formed in an interface between the grid and the active material to thereby cause a phenomenon of premature capacity loss (hereinafter referred to as PCL) that capacity is lowered prematurely. Since this PCL phenomenon is peculiar to the battery using a Pb-Ca alloy grid in a positive electrode, it may be conceived that a Pb-Sb alloy grid generally used in a flooded type battery can be applied also to the valve-regulated lead acid battery.

The battery using such a Pb-Sb alloy grid, however, has a characteristic that the rising of the battery voltage with the advance of charging becomes gentler and gentler as the charging and discharging is repeated. Hence, in the aforementioned charging method of performing controlling by detecting the change-over voltage, the battery voltage cannot reach the preset change-over voltage even if the charging advances so that the battery falls into an uncontrollable state. The uncontrollable state causes overcharging, and $H_2O$ in the electrolyte is electrolyzed. In the valve-regulated lead acid battery, however, if water is consumed, the electrolyte is dried up prematurely to make it impossible to use the battery because the battery contains only a minimum amount of the electrolyte. Hence, there is the existing situation that the valve-regulated lead acid battery using a Pb-Sb alloy grid free from the PCL phenomenon as a positive electrode grid has been never put into practical use actually because the charging apparatus has been a barrier.

SUMMARY OF THE INVENTION

It is therefore a first object of the present invention to provide a charging method and a charging apparatus in which charging time can be shortened even if the change-over voltage is set to a low value when constant-current charging is performed while a charging current is reduced stepwise.

It is a second object of the present invention to provide a charging method and a charging apparatus in which the change-over voltage can be detected securely to make it possible to perform constant-current charging while a charging current is reduced stepwise even in the case where the lead acid battery is of a type using a Pb-Sb alloy grid having a characteristic that rising of the battery voltage in charging becomes gentler if charging and discharging is repeated.

In order to achieve the above objects, according to the present invention, there is provided a method of charging a lead acid battery, comprising the steps of: performing primary constant-current charging using a predetermined current value; continuing the primary constant-current charging for a predetermined extension time after a battery voltage reaches a predetermined change-over voltage; and changing-over the charging to secondary constant-current charging using a smaller current value than that of the primary constant-current charging after the extension time has passed.

The battery voltage rises by the primary constant-current charging, and the primary constant-current charging is continued for a predetermined extension time after the battery voltage reaches a predetermined change-over voltage. Hence, even if the change-over voltage is set to a value lower than the conventionally set value, the primary constant-current charging with a larger charging current is not changed over to the secondary constant-current charging with a smaller charging current immediately after the set change-over voltage is reached, but the primary constant-current charging is further continued for the extension time, and then changed over to the secondary constant-current charging. Accordingly, the battery can be charged with a larger quantity of electricity, and the charging time can be shortened as well.

Further, in this case, if the extension time, that is, the duration of the primary constant-current charging continued after the battery voltage reaches the change-over voltage is set to be shorter as the battery temperature is higher, an optimum charging rate can be obtained to thereby prevent overcharging.

The aforementioned charging method and an apparatus using the method are suitable for a valve-regulated lead acid battery using a Pb-Sb alloy grid as a positive electrode grid. The development of this charging method makes it possible to put this type lead acid battery into practical use. The lead acid battery using a Pb-Sb alloy grid as a positive electrode grid has a characteristic that the rising of the battery voltage with the advance of charging becomes gentler and gentler as charging and discharging is repeated. According to the present invention, however, the rising of the battery voltage can be detected securely because the change-over voltage can be set to a low value. This means that the primary constant-current charging using a large current can be terminated securely so as to be changed over to the secondary constant-current charging using a small current. Hence, overcharging can be prevented from occurring securely. Further, the fact that there is no fear of occurrence of overcharging means that solution drying does not occur even if the method is used to charge a valve-regulated lead acid battery containing a very small amount of electrolyte. As a result, the valve-regulated lead acid battery using a Pb-Sb alloy grid as a positive electrode grid can be put into practical use, and the life thereof can be made prolonged. Hence, the practical usefulness thereof is very high in severe service for electric cars, etc.

DETAILED DESCRIPTION OF THE INVENTION

The present invention will be described in detail below referring to the accompanying drawings.

First, a valve-regulated battery with a 3 HR discharged capacity of 30 Ah was produced according to an ordinary method by using a positive electrode grid made of an alloy consisting of 1.2% by weight of antimony, 0.05% by weight of selenium, 0.1% by weight of tin, 0.2% by weight of arsenic, and a residue of lead.

Figure 1:
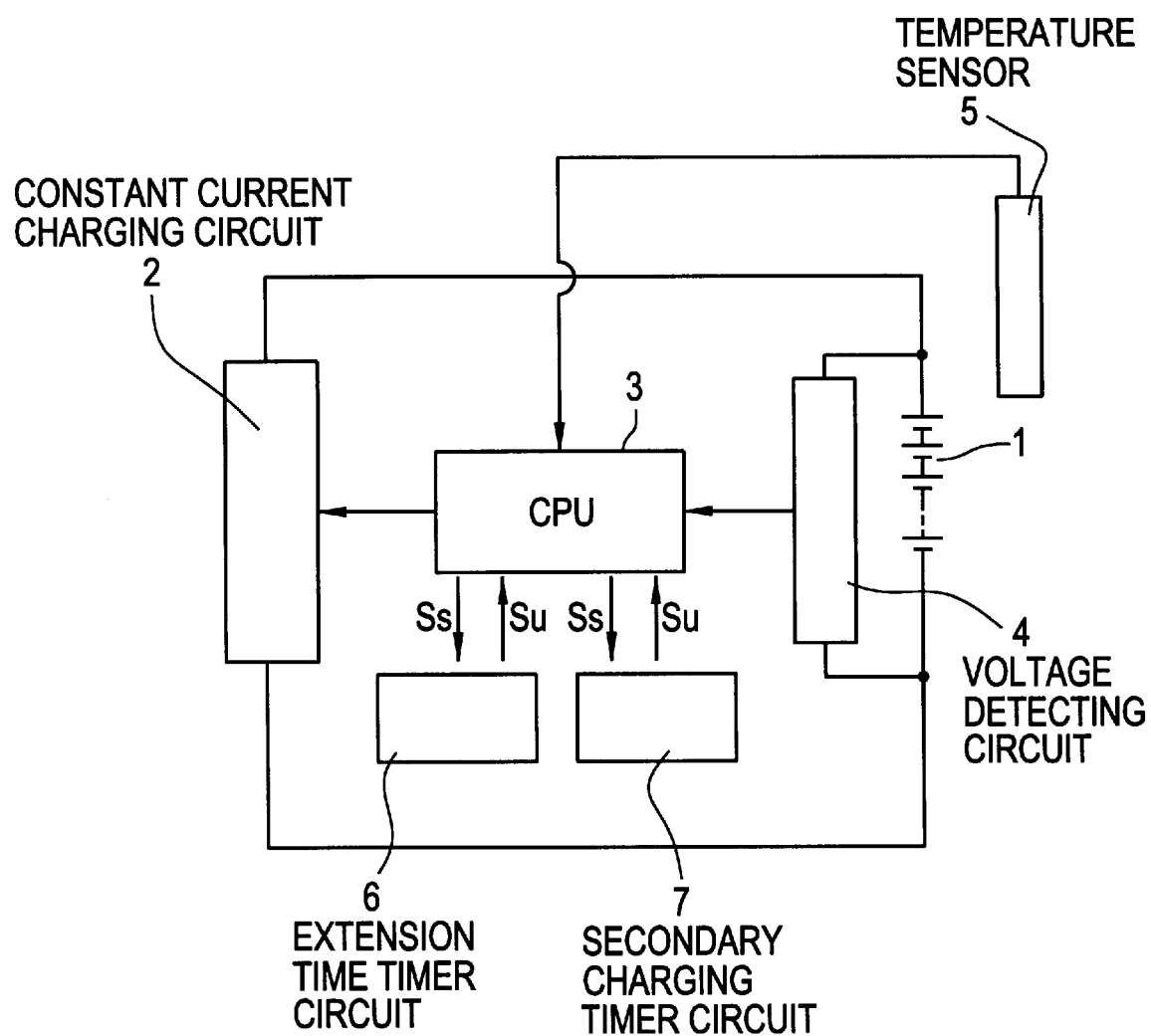
FIG. 1 is a block diagram showing a charging apparatus according to the present invention.

On the other hand, the configuration of a charging apparatus is as shown in FIG. 1. A constant-current charging circuit 2 is connected to the lead acid battery 1 produced in the aforementioned manner so that the constant-current charging circuit 2 charges the lead acid battery 1 with a constant current of a value set on the basis of a signal fed from a CPU 3. A voltage detecting circuit 4 is also connected to the lead acid battery 1 so that a signal corresponding to the battery voltage detected by the voltage detecting circuit 4 is fed to the CPU 3. A temperature sensor 5 attached to the lead acid battery 1 is further connected to the CPU 3 so that a signal corresponding to the temperature of the lead acid battery 1 is fed to the CPU 3. An extension time timer circuit 6 and a secondary charging timer circuit 7 are further connected to the CPU 3 so that each of the timer circuits 6 and 7 starts a time measuring operation in response to a start signal Ss fed from the CPU 3. The extension time timer circuit 6 sends a time-up signal Su to the CPU 3 when a predetermined "extension time $t_a$" expires. The secondary charging timer circuit 7 outputs a time-up signal when a set "secondary charging time $t_2$" has passed after the start of the secondary charging timer circuit 7. The CPU 3 is equivalent to a charging control means. By means of software, the CPU 3 has a function of feeding a current setting value to the constant-current charging circuit 2 timely in accordance with the battery voltage to make the constant-current charging circuit 2 execute the primary constant-current charging and the secondary constant-current charging successively. The CPU 3 functions also as an extension time setting means for setting the "extension time $t_a$" and further as a secondary charging timesetting means for setting the "secondary charging time $t_a$".

Figure 2:
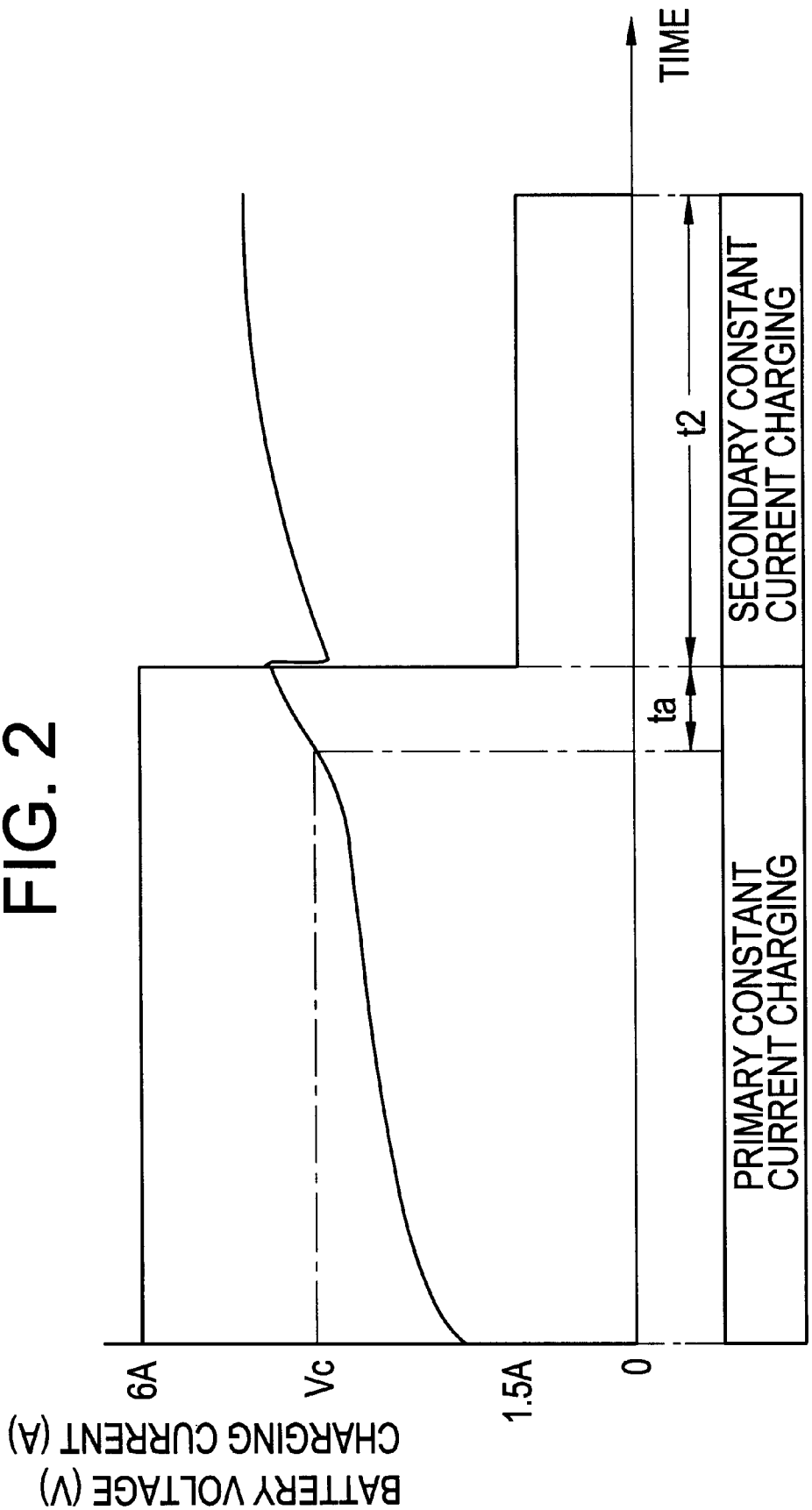
FIG. 2 is a graph showing the changes of current and voltage during charging.

First, the lead acid battery 1 was discharged by 50% (15 Ah). Then, the primary constant-current charging with a charging current of 6 A and the secondary constant-current charging with a charging current of 1.5 A were performed successively as shown in FIG. 2. The primary constant-current charging was changed over to the secondary one when the extension time $t_a$ expired after the battery voltage had reached a change-over voltage Vc=2.35 V/cell.

Particularly in this Example, the extension time $t_a$ was calculated in the CPU 3 according to the following expression (1) so that the extension time $t_a$ was set to be shorter as the temperature T became higher.

$$t_a = a - b \cdot ln(T+c) \quad \text{(Expression 1)}$$

In the expression (1), a, b and c are coefficients which take positive values respectively and which are set in consideration of the rated capacity of the battery, the configuration of the battery, the condition of use, the current value for the primary constant-current charging, the predetermined voltage change-over value, etc. In this Example, a=137, b=31 and c=8 were set. Incidentally, in the expression (1), the temperature T is expressed in degrees Celsius, and $t_a$ is expressed in minutes.

Also the "secondary charging time $t_2$", which was the time for execution of the secondary constant-current charging, was calculated in the CPU 3 according to the following expression (2) so that the secondary charging time $t_2$ was set to be likewise shorter as the temperature T became higher.

$$t_2 = d - e \cdot ln(T+f) \quad \text{(Expression 2)}$$

In the expression (2), d, e and f are coefficients which take positive values respectively and which are set in consideration of the rated capacity of the battery, the configuration of the battery, the condition of use, the current value for the primary constant-current charging, the predetermined voltage change-over value, the current value for the secondary constant-current charging, etc. In this Example, d=571, e=91 and f=8 were set. Incidentally, in the expression (2), the temperature T is expressed in degrees Celsius, and $t_2$ is expressed in minutes.

<Comparative Example>

On the other hand, in a Comparative Example in which the present invention was not carried out, charging was performed in the condition that both the extension time setting means and the secondary charging time setting means in the CPU 3 were invalidated so that $t_a$=24 minutes and $t_2$=4 hours were fixed for the sake of comparison with the Example.

<Discussion of Results>

Charging in the Example and the Comparative Example was executed at respective temperature of 5° C., 30° C. and 50° C. Results of the charging rate and the life by the number of cycles were obtained as shown in Table 1.

TABLE 1

|  | Example | | | Comparative Example | | |
|---|---|---|---|---|---|---|
| Temperature | 5° C. | 30° C. | 50° C. | 5° C. | 30° C. | 50° C. |
| Charging Condition | | | | | | |
| Primary Constant-Current Charging Extension Time $t_a$ (min) | 54 | 24 | 9 | 24 | 24 | 24 |
| Secondary Constant-Current Charging Time $t_2$ (hr-min) | 6-00 | 4-00 | 3-36 | 4-00 | 4-00 | 4-00 |
| Charging Rate (%/rated capacity) | 120 | 120 | 120 | 100 | 120 | 127 |
| Life Test Result | | | | | | |
| Life (the number of cycles) | 545 | 535 | 520 | 380 | 535 | 430 |
| Cause of Death | Deterioration of Positive/Negative Electrode Plate | Deterioration of Positive/Negative Electrode Plate | Deterioration of Positive/Negative Electrode Plate | Accumulation of Lead Sulfate on Negative Electrode Plate | Deterioration of Positive/Negative Electrode Plate | Drying up of electrolyte |

Figure 3:
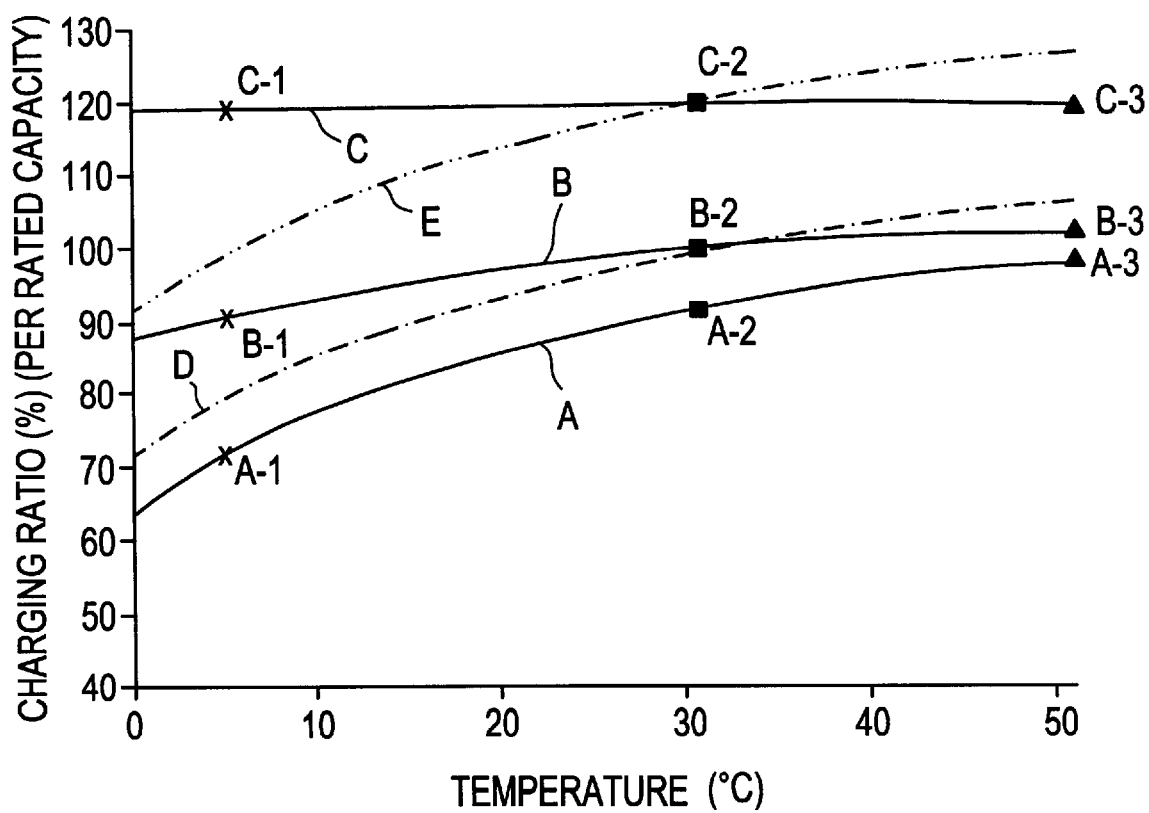
FIG. 3 is a graph showing the change of charging rate.

In the Example according to the present invention, the change of the charging rate (% per rated capacity) is as shown by the solid line in FIG. 3. Points A-1, A-2 and A-3 on the curve A show charging rates obtained at temperatures of 5° C., 30° C. and 50° C. respectively at the time when point of the battery voltage reaches the change-over voltage Vc. Points B-1, B-2 and B-3 on the curve B show charging rates obtained at the temperatures respectively at the point of time when the primary constant-current charging is terminated. Points C-1, C-2 and C-3 on the curve C show charging rates obtained at the temperatures respectively at the point of time when the secondary constant-current charging is terminated. On this occasion, the leftward decline of the curve A in FIG. 3 is based on the characteristic of the valve-regulated lead acid battery that the charging voltage value depends on the temperature. Hence, in the Comparative Example in which both the extension time $t_a$ and the secondary charging time $t_2$ are fixed, the charging rate at the point of time when the primary constant-current charging is terminated changes as shown by the curve D drawn by the alternate long and short dash line and the charging rate at the point of time when the secondary constant-current charging is terminated changes as shown by the curve E drawn by the alternate long and two short dashes line. That is, the Comparative Example shows a tendency that the charging rate decreases as the temperature becomes low. On the other hand, in the Example, the charging rate at the completion of charging changes as shown by the curve C, that is, the charging rate is kept constant irrespective of the temperature.

This fact has influence on the cycle life, that is, life expressed in the number of charge/discharge cycles. When the battery was charged at a temperature of 5° C. by the charging method of the Comparative Example in which both the values $t_a$ and $t_2$ were fixed, the battery died from the accumulation of lead sulfate as a negative electrode active material due to shortage of charging. When the battery was charged at a temperature of 50° C. by the charging method of the Comparative Example in which both the values $t_a$ and $t_2$ were fixed likewise, electrolyte was dried up, so that the battery died from disappearance of water due to excess of the charging rate. On the other hand, in the Example, the aforementioned phenomena did not occur, so that the cycle life was long. Even the charging method of the Comparative Example can be, however, used for cycle-charging the valve-regulated lead acid battery using a Pb-Sb alloy grid as a positive electrode grid as described preliminarily, so that the charging method can make the battery exhibit sufficient performance if it is not used particularly in a cold district or in a high-temperature condition.

Incidentally, it is preferable to attach the temperature sensor 5 to the lead acid battery 1 in order to detect the battery temperature as shown in the aforementioned Example. However, when the charging apparatus is provided as an external charging apparatus separately from the lead acid battery, the atmospheric temperature may be detected so that the battery temperature is inferred and calculated from the atmospheric temperature. In most cases, the atmospheric temperature can be estimated to be substantially equal to the battery temperature at the start of charging because the battery temperature at least at the start of charging is approximately equal to the atmospheric temperature. Moreover, though the battery temperature rises with the advance of charging, the temperature rising curve in accordance with the charging rate can be guessed empirically if the battery temperature at the start of charging can be found. Accordingly, the battery temperature at the point of time when the battery voltage reaches the change-over voltage can be calculated and determined with a certain degree of accuracy from the atmospheric temperature at the start of charging.

Although the aforementioned example has shown an example of the charging apparatus for charging a valve-regulated lead acid battery using a Pb-Sb alloy grid as a positive electrode grid, the charging apparatus can be applied also to a flooded type lead acid battery other than the valve-regulated battery, and further applied to a lead acid battery using a Pb-Ca alloy grid as a positive electrode grid. In the case of a lead acid battery using a Pb-Ca alloy grid as a positive electrode grid, the secondary constant-current charging may be terminated on the basis of detection of the battery voltage's arrival at a predetermined voltage.

Although the aforementioned example has shown the case where two-stage constant-current charging is performed with two kinds of current values used for charging, the invention is not limited thereto and can be applied also to the case where three-stage constant-current charging is performed with three kinds of stepwise reduced current values used for charging. In this case, tertiary constant-current charging may be performed with use of a smaller current value after the secondary constant-current charging in the aforementioned example is terminated.

Although the aforementioned example has shown the case where so-called hardware timers are formed by use of the extension time timer circuit 6 and the secondary charging timer circuit 7, the invention is not limited thereto and may be applied also to the case where software timers are formed by use of software of the CPU 3.

What is claimed is:

1. A method for charging a lead acid battery, comprising the steps of:
    performing primary constant-current charging at a predetermined current value;
    continuing said primary constant-current charging for a predetermined extension time after a battery voltage reaches a predetermined change-over voltage; and
    changing-over the charging to secondary constant-current charging using a smaller current value than that of said primary constant-current charging after said extension time has passed.

2. The method according to claim 1, wherein a duration of said primary constant-current charging continued after arrival at said change-over voltage is set to be shorter as a battery temperature is higher.

3. An apparatus for charging a lead acid battery, comprising:
    a constant-current charging circuit for charging said lead acid battery with a constant current of a set value;
    a voltage detecting circuit for detecting a battery voltage of said lead acid battery which is being charged;
    a timer means for detecting expiration of a predetermined extension time by measuring time after the battery voltage detected by said voltage detecting circuit reaches a predetermined change-over voltage; and
    a charging control means for controlling said constant-current charging circuit in response to a charging start operation so that said constant-current charging circuit starts primary constant-current charging using a predetermined current value, continues said primary constant-current charging until the time measured by said timer means reaches said extension time under a condition that the battery voltage detected by said voltage detecting means reaches said predetermined change-over voltage, and performs secondary constant-current charging using a current value smaller than that of said primary constant-current charging after said extension time has passed.

4. An apparatus for charging a lead acid battery according to claim 3, further comprising:
    a temperature sensor for detecting a battery temperature substantially; and
    an extension time setting means for setting said extension time so as to be shorter as the temperature detected by said temperature sensor is higher.

5. An apparatus for charging a lead acid battery according to claim 3, further comprising:
    a stop time timer means for measuring time after said charging control means starts said secondary constant-current charging, wherein
    said charging control means stops said secondary constant-current charging when said stop time timer means has measured a predetermined secondary charging time.

6. An apparatus for charging a lead acid battery according to claim 5, further comprising:
    a temperature sensor for detecting a battery temperature substantially; and
    a secondary charging time setting means for setting said secondary charging time so as to be shorter as the temperature detected by said temperature sensor is higher.

7. A charging apparatus for charging a valve-regulated lead acid battery using a Pb-Sb alloy grid as a positive electrode grid, comprising:
    a constant-current charging circuit for charging said lead acid battery with a constant current of a set value;
    a voltage detecting circuit for detecting a battery voltage of said lead acid battery which is being charged;
    a timer means for measuring time after the battery voltage detected by said voltage detecting circuit reaches a predetermined change-over voltage to thereby detect expiration of a predetermined extension time; and
    a charging control means for controlling said constant-current charging circuit in response to a charging start operation so that said constant-current charging circuit starts primary constant-current charging using a predetermined current value, continues said primary constant-current charging until the time measured by said timer means reaches said extension time under a condition that the battery voltage detected by said voltage detecting means reaches said predetermined change-over voltage, and performs secondary constant-current charging using a current value smaller than that of said primary constant-current charging after said extension time has passed.

8. A charging apparatus for charging a valve-regulated lead acid battery using a Pb-Sb alloy grid as a positive electrode grid according to claim 7, further comprising:
    a temperature sensor for detecting a battery temperature substantially; and
    an extension time setting means for setting said extension time so as to be shorter as the temperature detected by said temperature sensor is higher.

9. A charging apparatus for charging a valve-regulated lead acid battery using a Pb-Sb alloy grid as a positive electrode grid according to claim 7, further comprising
    a stop time timer means for measuring time after said charging control means starts said secondary constant-current charging, wherein
    said charging control means stops said secondary constant-current charging when said stop time timer means has measured a predetermined secondary charging time.

10. A charging apparatus for charging a valve-regulated lead acid battery using a Pb-Sb alloy grid as a positive electrode grid according to claim 9, further comprising:
    a temperature sensor for detecting a battery temperature substantially; and
    a secondary charging time setting means for setting said secondary charging time so as to be shorter as the temperature detected by said temperature sensor is higher.

* * * * *